(12) United States Patent
Lefever et al.

(10) Patent No.: US 6,733,575 B1
(45) Date of Patent: May 11, 2004

(54) HOT GAS FILTRATION SYSTEM

(75) Inventors: Ignace Lefever, Deerlijk (BE); Ronny Losfeld, Waregem (BE); Johan Vandamme, Deinze (BE)

(73) Assignee: N.V. Bekaert S.A., Zwevegem (BE)

( * ) Notice: Subject to any disclaimer, the term of this patent is extended or adjusted under 35 U.S.C. 154(b) by 0 days.

(21) Appl. No.: 10/018,253

(22) PCT Filed: May 24, 2000

(86) PCT No.: PCT/EP00/04730
§ 371 (c)(1),
(2), (4) Date: Dec. 18, 2001

(87) PCT Pub. No.: WO00/78431
PCT Pub. Date: Dec. 28, 2000

(30) Foreign Application Priority Data

Jun. 18, 1999 (EP) .............................................. 99201951

(51) Int. Cl.$^7$ .............................................. B01D 39/20
(52) U.S. Cl. .............................. 95/285; 55/484; 55/524; 55/527; 110/216
(58) Field of Search ................................ 110/203, 216, 110/217; 60/39.12; 55/484, 488, 490, 523, 524, 526, 527; 420/34, 62, 77, 79; 95/273, 285

(56) References Cited

U.S. PATENT DOCUMENTS

| 4,126,560 A | * | 11/1978 | Marcus et al. | 210/489 |
|---|---|---|---|---|
| 4,270,936 A | * | 6/1981 | Mann | 55/520 |
| 4,667,467 A | | 5/1987 | Archer et al. | |
| 5,165,899 A | * | 11/1992 | Delaunay et al. | 422/180 |
| 5,505,757 A | * | 4/1996 | Ishii | 55/523 |
| 5,611,832 A | * | 3/1997 | Suzuki et al. | 55/523 |
| 6,290,743 B1 | * | 9/2001 | Alvin et al. | 55/482 |

FOREIGN PATENT DOCUMENTS

| BE | 1 008 484 | 5/1996 |
|---|---|---|
| EP | 0 515 124 | 11/1992 |
| EP | 0 572 063 | 12/1993 |
| EP | 0 764 455 | 3/1997 |
| JP | 6-340943 A | * 12/1994 |
| WO | 94/14608 | 7/1994 |
| WO | 95/32048 | 11/1995 |

* cited by examiner

Primary Examiner—Frank M. Lawrence
(74) Attorney, Agent, or Firm—Foley & Lardner

(57) ABSTRACT

A coal-fired power generation system including means for the production of coal-derived gas and a filter system for the filtration of this coal-derived gas. The filter system comprises at least one high temperature and, corrosion resistant filter. The filter is made from a Fe—Cr—Al based alloy further comprising at least one additional element selected from the group consisting of Sc, Y, Ti, Zr, Hf, V, Nb, Ta and the lanthanides.

14 Claims, 1 Drawing Sheet

HOT GAS FILTRATION SYSTEM

FIELD OF THE INVENTION

The invention relates to a hot gas filtration system comprising high temperature and corrosion; resistant filters.

BACKGROUND OF THE INVENTION

Hot gas filtration is for example used in the furnace exhaust of gases resulting from the combustion of fossil fuels. These fuels contain many impurities. Many filters have been used to reduce or eliminate the impurities in such furnace exhaust gases. However, there is still a need for improved filters which are capable of withstanding higher temperatures and pressures for removing particulates from hot combustion gases.

Especially in coal-fired power generation systems and more particularly in combined cycle power technologies, there is a big need for high temperature resistant and corrosion resistant filters. These technologies are based on the combustion and gasification of coal whereby the gas turbine is driven by the coal-derived gas.

Typical combined cycle power systems are pressurized fluidized bed combustor (PFBC) based systems, integrated gasification combined cycle (IGCC) based systems and hybrid cycle based systems. Some of these systems are already in operation, others are in development or at the demonstration stage.

A critical step in all these systems is the filtration of hot gases for the removal of particulates and other contaminants.

In these technologies, an effective and reliable hot gas filtration is of the utmost importance not only to meet the environmental emission requirements but also to protect the gas turbine components against fouling and erosion.

For such systems high performance, reliable hot gas filtration systems operating at high temperatures (200–900° C.) with a high corrosion resistance are required.

Particulates and contaminants such as sulfur, alkali metals and heavy metals have to be removed by the filter. Also the concentration of hydrogen halides such as HCl and HF is preferably low to protect the components of the turbine. This can be a serious problem when high chlorine coals are gasified.

Up to now, the filtration of gases is a limiting factor for coal-fired combustion systems, because there are no filters which meet the above mentioned requirements.

Presently available filters for the filtration of hot gases are for example ceramic filters. A considerable drawback of this type of filters is their limited temperature range,(250–450° C.) in which they can be operated. Ceramic filters also have the disadvantage that they suffer from thermal fatigue and high temperature corrosion, particularly in high temperature oxidising environments. The service life of ceramic filters is limited because the gas phase may react with the amorphous binderphase and because of oxidation of non-oxide based ceramics. Phase transitions may further put restrictions on the service life of such filters.

Still another drawback of ceramic filters is their limited shock resistance, either mechanical or thermal shock resistance. This can cause problems, for example during pulse cleaning.

An alternative for ceramic filters is the use of metallic filters. However, the known metallic filters feature the disadvantage that they are only suitable in reducing environments at low or intermediate temperatures (350–600° C.). When these filters are exposed to an oxidising environment, they suffer considerably from corrosion. Also impurities, such as sulfur or sulfur containing compounds or hydrogen halides may only be present in low concentrations in order to avoid corrosion.

WO 9532048 describes a filter comprising FeAl or $FeAl_3$ powder. The resistance is improved when a certain amount of Cr is added.

SUMMARY OF THE INVENTION

It is an object of the present invention to avoid the drawbacks of the prior art.

It is another object to provide a coal-fired power generation system comprising a number of high temperature and corrosion resistant filters. It is also an object to provide filters for such a system which can be used both in an oxidising or in a reducing atmosphere, which can withstand repeated temperature cycles and which has a high resistance against thermal and mechanical shocks.

Moreover, the invention aims to provide a system having a high filter performance, a high reliability and a long-term durability.

According to a first aspect of the present invention a coal-fired power generation system comprising means for the production of coal-derived gas and a filter system for the filtration of said coal-derived gas is provided.

The filter system comprises at least one high temperature and corrosion resistant filter. This filter comprises a filter medium and filter caps. The filter medium comprises at least one layer of metal fibers which has been sintered. Both the filter caps and the metal fibers are made from an iron-chromium-aluminium (Fe—Cr—Al) based alloy.

The diameter of the metal fibers is preferably between 4 and 30 $\mu$m, more preferably the diameter is between 8 $\mu$m and 22 $\mu$m.

The weight of the filter medium is preferably between 600 and 1500 $g/m^2$ and more preferably between 750 and 1200 $g/m^2$. The filter medium has a porosity between 60 and 85% and preferably between 65 and 80%. In order to improve the resistance of the filter a protective $Al_2O_3$ layer may be formed on the surface of the filter medium and on the other elements being part of the filter. This protective layer may be obtained by preoxidising the filter.

In one embodiment the filter medium comprises a non-woven layer of metal fibers. The web is sintered and preferably compacted. In a further step, the sintered medium is welded to form the filter.

In another embodiment a filter medium comprising at least a first and a second layer is provided. Each layer comprises a web of metal fibers. The first layer, at the flow in side of the filter medium comprises metal fibers with a diameter between 4 and 12 $\mu$m. The diameter of the fibers of the second layer, this is the layer at the flow out side, is between 12 and 30 $\mu$m.

It is preferred that the weight of the first layer is between 20 and 60% of the total weight of the filter medium. More preferably, the weight of the first layer is between 40 and 60% of the total weight.

The first and second layer are brought into contact with each other to form a layered structure. This layered structure is sintered and compacted. In a subsequent step, the sintered and compacted filter medium is welded to form the filter.

In a preferred embodiment a mesh is fixed to the filter medium as a support layer.

The mesh may be fixed to the layer situated at the flow out side.

In an alternative way the mesh may be sandwiched between a first and a second layer of metal fibers.

The layered structure comprising the layer or layers of metal fibers and comprising the mesh is then sintered in a subsequent step.

As mentioned before, all components being part of the filter such as the metal fibers, the filter caps, and when a mesh is present also the mesh, are made from a Fe—Cr—Al based alloy.

A first group of Fe—Cr—Al based alloys comprises 15 to 25 wt % Cr and 4 to 6 wt % Al. Preferably the Al content is between 4.8 and 5.7 wt %.

A preferred alloy composition is a Fe—Cr—Al based alloy further comprising Y. This alloy is known as Fecralloy®.

The Y content ranges from 0.03 to 0.5 wt % and is preferably between 0.08 and 0.35 wt %. Most preferably, the Y content is between 0.25 and 0.35 wt %. Another possible alloy composition of this group is a Fe—Cr—Al based alloy further comprising at least one additional element selected form the group consisting of Sc, Y, Ti, Zr, Hr, Ta and the lanthanides, for example La or Ce.

The content of the additional element or the sum of the additional elements is between 0.01 and 1 wt %.

A second group of Fe—Cr—Al based alloys comprises up to 15 wt % Cr and 20 to 60 wt % Al. These alloys further comprise at least one additional element selected from the group consisting of Sc, Y, Ti, Zr, Hf, V, Nb, Ta and the lanthanides.

The Fe—Cr—Al based alloys show good corrosion resistance and high temperature resistance characteristics.

This resistance may further be improved by the presence of an oxide layer, more particularly an $Al_2O_3$ layer on the surface. Such a protective oxide layer limits the further oxidation of the metal since the oxygen can not diffuse through the $Al_2O_3$ layer. To obtain the desirable protection, a dense $Al_2O_3$ layer with a sufficient thickness is preferred.

During operation an oxide layer is formed spontaneously on the outside by oxidation of Al to $Al_2O_3$.

Alternatively, the alloy may be preoxidised under controlled conditions to form an $Al_2O_3$ protective layer. This preoxidation is preferably carried out in a furnace at a temperature between 1000° C. and 1200° C. and more preferably at a temperature between 1100° C. and 1200° C.

Either in the case of the spontaneous oxidation or in the case of the controlled preoxidation, a protective $Al_2O_3$ layer is formed on the surface of the filter medium. However, the structure of the $Al_2O_3$ layer formed in the two situations is different: the spontaneous formed Al-oxide has a θ-structure, while the Al-oxide formed during the preoxidation step under the above mentioned conditions has predominantly an α-structure. By the term 'predominantly' is meant that there may be occasionally some defects. Although, when the oxide layer is formed at a temperature between 1 100° C. and 1200° C., the oxide layer shows almost no defects. This is in contrast with oxide layers formed at lower temperatures for example at 1000° C., these oxide layers contain at least to some extent $θ-Al_2O_3$ and show much more defects. The quality of the $Al_2O_3$ layer further deteriorates when the oxidation is carried out at still lower temperatures.

The spontaneous formed $Al_2O_3$ (θ-form) has a rather porous structure. This oxide protection layer does not always give the material a sufficient protection, especially not in a reducing atmosphere or when the material is subjected to thermal cycles.

The $α-Al_2O_3$ on the contrary has a denser structure. Therefore, the α-form gives a much better protection, than the porous θ-form. This layer of $α-Al_2O_3$ is giving an excellent protection, even in a reducing atmosphere at high temperatures.

The alloy may show the tendency for the oxide to spall. The spalling can be a serious problem when the alloy is subjected to repeated thermal cycles. The spalling of the protective scale can however be limited and even be a voided when a certain amount of Y is added to the alloy. Therefore, a concentration of Y ranging from 0.03 wt % to 0.5 wt % is desired. More preferably, the Y concentration is between 0.25 wt % and 0.35 wt %.

Also the addition of traces of an element such as Sc, Y, Ti, Zr, Hf, Nb or a lanthanide improves the functional characteristics at high temperatures.

The filters may be flat filters, although candle filters and tubular filters are preferred.

A filter candle is a cylindrical tube with porous walls, closed at one end.

Tubular filters are cylindrical tubes open at both ends.

A typical candle filter or tubular filter has an overall length between 1 and 2 m, for example 1.50 m, a wall thickness between 0.2 and 0.8 mm and an outside diameter of for example 60 mm.

Usually a filter system comprises a large number of filter elements. mostly arranged in multiple arrays. Typical numbers are 800, 1500 or 9600. The volume of the gas to be filtered and the filtration velocity achievable influences the necessary number of filter elements. The number of filter elements is different for the different technologies, such as IGCC or PFBC.

Filters comprising metal fibers furthermore have the advantage that they have a high resistance against thermal and mechanical shocks. The filters according to the invention may withstand frequent thermal cycles without problems.

The cleaning of metal filters is easier than the cleaning of for example ceramic filters or filters comprising metal powder. The filters may easily withstand repeated cleaning such as pulse cleaning. This results in filters having a long durability and a long service life.

A filter made from the above described Fe—Cr—Al based alloys withstands temperatures up to 1100° C.

Because of the presence of a sufficient thick and dense $Al_2O_3$ protection layer, there is no considerable corrosion observed. The presence of Y avoids the spalling of the oxide.

The filter shows a good resistance in an oxidising environment at high temperatures, for example at 900° C.

The desired resistance in a reducing environment at these high temperatures is obtained as well.

Since these filters may withstand the combustion temperature of coal, they may successfully be integrated in coal-fired power generation systems.

The filters are in particular suitable for the filtration of hot gases in pressurized fluidized bed combustor (PFBC) based systems integrated gasification combined cycle (IGCC) based systems and hybrid cycle based systems.

According is a further aspect of the invention, a method whereby the yield of the coal-fired power generation system is increased, is provided.

In a first step of this method a coal-derived gas is produced. This coal-derived gas is then filtered in a second step by means of a filter system comprising a number of the above described filters.

Since the filter may resist high temperatures, the filtration of the coal-derived gas may be carried out at temperatures up to 850° C. and even at higher temperatures, for example at 900° C.

Because the filtration can be carried out at temperatures near the combustion temperature of coal, cooling of the gas before the filtration is superfluous. This results in a simplified installation and in a less expensive process.

Moreover the yield of the process is increased. Because of the high inlet temperatures to the turbine, IGCC and PFBC systems with efficiencies of over 40%, for example over 45% can be reached.

Because the pressure drop of the filter medium according to the invention is low, the necessary total filter surface of an installation is low. Accordingly, the number of filter elements is much lower than in the case conventional ceramic filters are used, which reduces the cost of the filter system.

As filters comprising metal fibers may withstand frequent thermal cycles, and as these filters may easily be cleaned, for example by pulse cleaning, the filters have a long service life. The frequency of replacement is thus considerably decreased, for example in comparison with ceramic filters or with filters comprising metal powder. This has a direct influence on the process and on the operational costs of production. After all replacing a filter medium is not only labour intensive but requires the interruption of the process and the cooling of the installation.

A high temperature and corrosion resistant filter may be manufactured by a method comprising the following steps:
  providing a first layer of metal fibers;
  if the filter medium comprises a second layer: providing a second layer of metal fibers and stacking up the first and second layer to form a layered structure;
  sintering the first layer of metal fibers in the case there is only one layer or sintering the layered structure in the case there are more layers to form a sintered filter medium;
  compacting the sintered filter medium;
  welding the sintered and compacted filter medium to form the filter;
  preoxidising the filter.

Preferably, the compacting step is done by means of a cold isostatic pressing operation.

In an alternative method, each web is sintered and compacted in advance. Thereafter, the different layers are stacked up to form a layered structure. The obtained layered structure is then sintered in a subsequent step.

A mesh may be fixed to the filter medium before the sintering of the obtained layered structure. The mesh may be fixed at the flow out side of the layer of metal fibers or at the flow out side of the layered structure comprising different layers of metal fibers.

In another embodiment the mesh is put in between a first and a second layer of metal fibers.

To improve the resistance of the filter, the filter may be preoxidised. This preoxidation step is preferably carried out in clean air at a temperature between 1000° C. and 1200° C. and more preferably between 1100° C. and 1200° C. The duration of the preoxidation may vary from 15 minutes to 3 hours. Preference is given to a preoxidation time from 2 till 3 hours. To accelerate the formation of the $Al_2O_3$ layer and to improve the quality of the $Al_2O_3$ layer, oxygen enriched air can be introduced in the furnace in which the oxidation is carried out.

BRIEF DESCRIPTION OF THE DRAWINGS

The invention will be described into more detail with reference to the accompanying drawing wherein.

Figure 1:
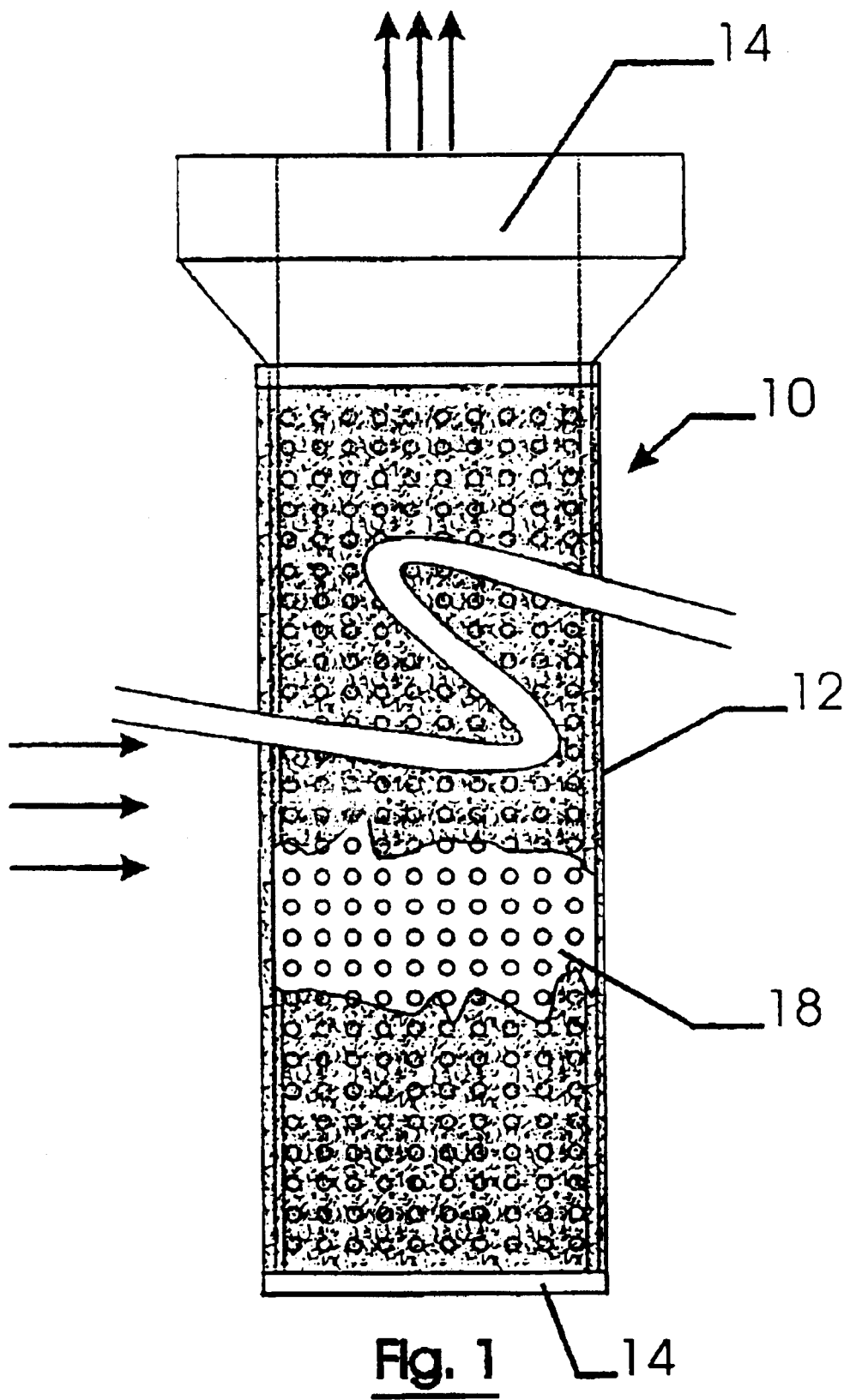
FIG. 1 shows a filter candle according to the invention.

DESCRIPTION OF THE PREFERRED
EMBODIMENTS OF THE INVENTION

Referring to FIG. 1, a corrosion and high temperature resistant filter candle 10 is provided. All elements which are part of this filter candle, such as the filter medium 12 and the filter caps 14, are made from Fecralloy. The alloy comprises 0.30 wt % Y.

The filter medium is a layered structure comprising two layers. The filter medium may be supported, for example by a perforated tube 18.

The first layer is a web of fibers with a diameter of 12 μm. This first layer has a weight of 600 g/m².

The second layer is a web of fibers with a diameter of 22 μm. The weight of the second layer is 450 g/m².

The first and the second layer are brought into contact with each other and are sintered. The sintered filter medium is then compacted by a cold isostatic pressing operation.

The thus obtained filter medium has a weight of 1050 g/m², a thickness of 0.58 mm and a porosity of 77.26%.

The sintered filter medium is welded to form the filter candle. The filter candle has an overall length of 1.50 m and an outside diameter of 60 mm.

In a subsequent step the filter is preoxidised to form an $Al_2O_3$ layer on the surface by putting the filter in a furnace at a temperature of 1100° C. during 2 hours.

In operation, the dirty gas flows through the filter medium from the outside to the inside of the candle. The clean gas leaves the candle through the opening. The direction of the gas flow is indicated by the arrows in FIG. 1.

The above described filter medium has been subjected to a conventional textest for measuring the air permeability and to a bubble point pressure test. The results are shown in table 1. They are compared with the results of two other similar filter media, the one having a porosity of 77.1%, the other having a porosity of 62.1%.

The tested filter media are all composed of two layers of metal fibers.

The first layer comprises fibers with a diameter of 12 μm and has a weight of 600 g/m². The second layer comprises fibers with a diameter of 22 μm and has a weight of 450 g/m².

TABLE 1

|  | Medium 1 | Medium 2 | Medium 3 |
|---|---|---|---|
| Weight (g/m²) | 1050 | 1050 | 1050 |
| Thickness (mm) | 0.58 | 0.45 | 0.35 |
| Global porosity (%) | 77.26 | 77.1 | 62.1 |
| Textest |  |  |  |
| Average (liter/dm²) at 200 Pa | 260.67 (s = 6.02) | 141.00 (s = 13.62) | 70.33 (s = 8.73) |
| Bubble point pressure test |  |  |  |
| Average (Pa) | 1547.50 | 1892.5 | 2210.0 |
| Filter rating (um) | 33.91 | 19.55 | 16.74 |

To evaluate the temperature resistance and the behaviour of Fecralloy when subjected to thermal cycles, an aging test is carried out.

A medium comprising Fecralloy fibers is considered in this test.

The medium is first preoxidised at 1100° C. during 2 hours in a furnace. By this preoxidation an $Al_2O_3$ layer was formed on the surface of the medium. XRD (X Ray diffraction) shows that the formed $Al_2O_3$ layer is $\alpha$-$Al_2O_3$.

By scanning microscopy a considerable increase of Al at the surface of the fibers could be observed.

The medium was then subjected to an aging test during one month. The medium was thereby alternately exposed to heating and cooling cycles. The heating periods take 8 minutes, the cooling intervals 2 minutes. During heating the temperature rose up to 1080° C.

After the test was carried out the samples were evaluated by visual inspection and by scanning microscopy.

Scanning microscopy showed an increase of Al at the surface of the fibers.

No damage of the medium was observed after a test period of one month.

To evaluate the corrosion resistance, samples of sintered Fecralloy fibers with a diameter of 12 $\mu$m and samples of sintered Fecralloy fibers with a diameter of 22 $\mu$m are subjected to a corrosion test. The composition of the Fecralloy was as follows: 15.8 wt % Cr, 4.8 wt % Al, 0.3 wt % Y, 0.03 wt % C, the balance is Fe.

Both preoxidised and non preoxidised Fecralloy samples were considered in the test. The preoxidation was carried out at 1100° C. during 15 minutes.

For the corrosion test, the samples were exposed during 1000 hours to the combustion atmosphere of a fuel containing 1% S, resulting in a $SO_2$ content of 280 ppm. The temperature of the gas was about 600° C.

In a first test there was no HCl present, in a second test 100 ppm HCl was added to the atmosphere. The samples were subjected every 24 hours to thermal cycles from room temperature to 600° C.

The results of these samples were compared with samples comprising other sintered metal fibers such as AISI 310, Inconel® and Hastelloy® fibers, having the same diameters as the Fecralloy fibers, 12 $\mu$m and 22 $\mu$m.

After the corrosion test the degree of corrosion was evaluated by visual inspection of the samples, by comparison of the weight of the samples before and after the test and by the study of the results of optical microscopy.

The samples made of Fecralloy showed superior corrosion and heat resistance if compared with the other stainless steel samples.

When the non pretreated and the preoxidised Fecralloy samples were compared the preoxidised samples showed the best resistance either in an environment containing HCl or in an environment without HCl. XRD (x ray diffraction) showed that the protective oxide layer formed on the surface of the preoxidised samples is $\alpha$-$Al_2O_3$.

What is claimed is:

1. A coal-fired power generation system comprising means for the production of coal-derived gas and a filter system for the filtration of said coal-derived gas, said filter system comprising at least one high temperature and corrosion resistant filter (10); said filter comprising a filter medium (12) and filter caps (14); said filter medium comprising at least one layer, said layer being a web of metal fibers which has been sintered, said filter caps and said metal fibers being made from a Fe—Cr—Al based alloy, said alloy having one of the following compositions 15 to 25 wt % Cr, 4 to 6 wt % Al, at least one additional element selected from the group consisting of Sc, Y, Ti, Zr, Hf, V, Nb, Ta and the lanthanides, the remainder being Fe;

up to 15 wt % Cr, 20 to 60 wt % Al, at least one additional element selected from the group consisting of Sc, Y, Ti, Zr, Hf, V, Nb., Ta and the lanthanides, the remainder being Fe;

wherein an $Al_2O_3$ layer is formed on the surface of said filter, said $Al_2O_3$ layer being predominantly $\alpha Al_2O_3$, wherein said $Al_2O_3$ layer has almost no defects.

2. A system according to claim 1, wherein said metal fibers have a diameter between 4 $\mu$m and 30 $\mu$m.

3. A system according to claim 1, wherein said filter medium comprises at least a first layer and a second layer, said first layer comprises a web of metal fibers with a diameter between 4 $\mu$m and 12 $\mu$m, said second layer comprises a web of metal fibers with a diameter between 12 $\mu$m and 30 $\mu$m, the first and second layer are brought into contact with each other to form a layered structure, and wherein said layered structure is sintered.

4. A system according to claim 1, wherein the filter medium has a porosity between 60 and 85%.

5. A system according to claim 1, wherein a mesh is fixed to the filter medium at the flow out side, said mesh is made from a Fe—Cr—Al based alloy.

6. A system according to claim 3, wherein a mesh is sandwiched between the first and the second layer of metal fibers before the medium is sintered, said mesh being made from a Fe—Cr—Al based alloy.

7. A system according to claim 1, wherein the additional element is Y with a concentration between 0.03 and 0.5 wt %.

8. A system according to claim 7, wherein the Y content ranges between 0.25 and 0.35 wt %.

9. A system according to claim 1, wherein the sum of the additional elements is between 0.01 and 1 wt %.

10. A system according to claim 1, wherein said filter is a candle filter or a tubular filter.

11. A system according to claim 10, wherein said system comprises a number of filters arranged in multiple arrays.

12. The filtration of hot gases in a system according to claim 1 at temperatures higher than 850° C.

13. The filtration of hot gases in a system according to claim 1 at temperatures of about 1100° C.

14. A system according to claim 1, wherein said filtration of said coal-derived gas occurs in a reducing atmosphere.

* * * * *